United States Patent [19]
Chan et al.

[11] Patent Number: 5,761,347
[45] Date of Patent: Jun. 2, 1998

[54] METHOD AND SYSTEM FOR HALFTONING BY TILING SUBSETS OF A THRESHOLD ARRAY OVER PORTIONS OF AN IMAGE

[75] Inventors: Thomas C. Chan, Santa Clara; Kok S. Chen, Sunnyvale, both of Calif.

[73] Assignee: Apple Computer, Inc., Cupertino, Calif.

[21] Appl. No.: 719,825

[22] Filed: Sep. 30, 1996

[51] Int. Cl.$^6$ .................................................. H04N 1/405
[52] U.S. Cl. ................................... 382/270; 358/457
[58] Field of Search ........................... 382/270; 358/460, 358/456, 457, 466, 298; 395/109

[56] References Cited

U.S. PATENT DOCUMENTS 4,517,605  5/1985  Yokomizo ................................ 358/457

Primary Examiner—Scott Rogers
Attorney, Agent, or Firm—Nancy R. Simon

[57] ABSTRACT

A first memory associated with a system for halftoning stores a threshold array, wherein the threshold array is comprised of threshold array values. When the pixel display values in an image are to be halftoned, a subset of the threshold array values stored in the first memory is transferred to a buffer. When all of the portions of pixel display values that correspond to the subset of threshold array values stored in the buffer have been halftoned, a new subset of threshold array values are stored in the buffer. Portions of pixel display values that correspond to the new subset of threshold array values stored in the buffer are then halftoned by repeatedly using the new subset of threshold array values stored in the buffer. This process continues until all of the pixel display values in the image have been halftoned. When the portion of pixel display values are halftoned, they can be output to an output device on the fly, i.e. as they are halftoned, or saved in a buffer and sent to an output device at a later time.

18 Claims, 5 Drawing Sheets

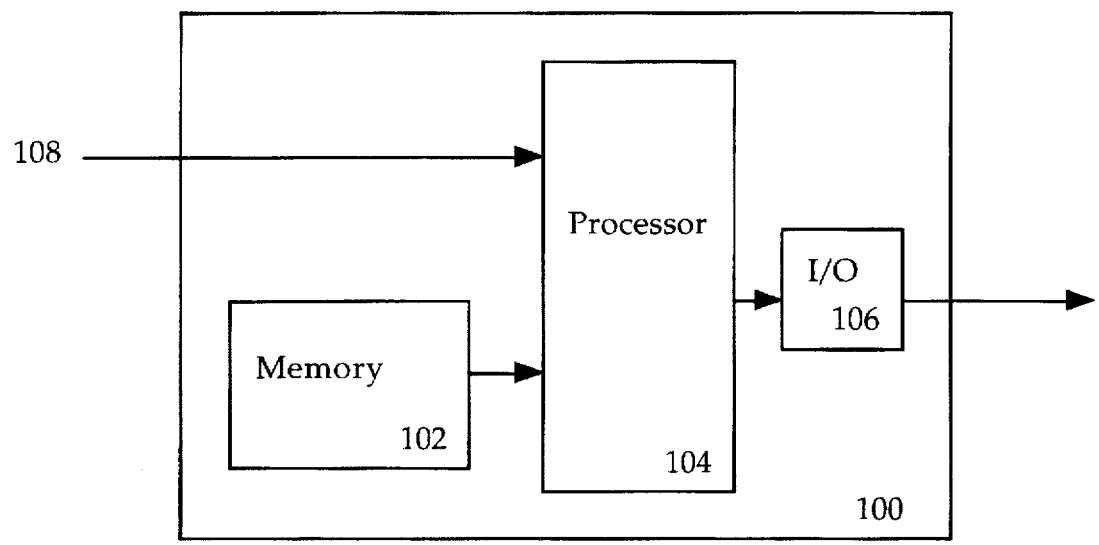
Figure 1a - Prior Art
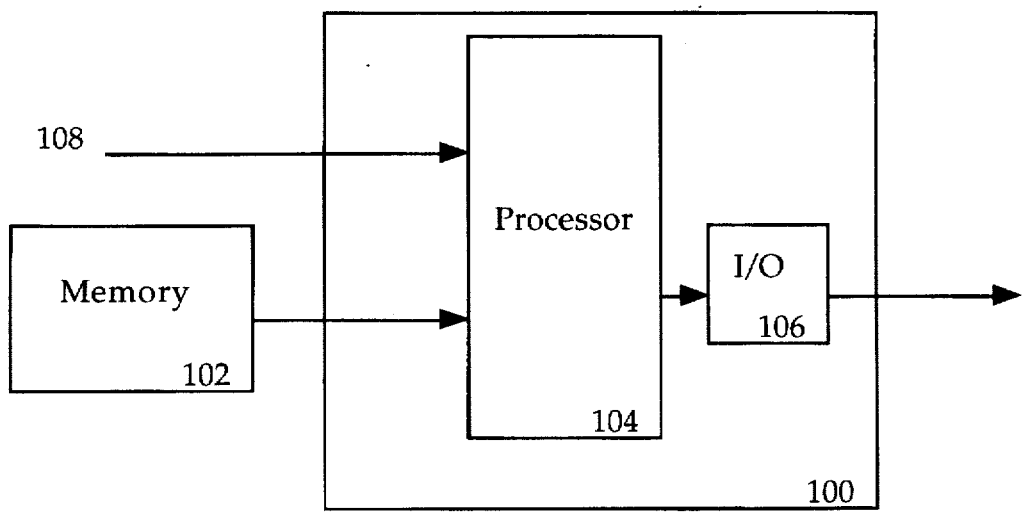
Figure 1b - Prior Art

METHOD AND SYSTEM FOR HALFTONING BY TILING SUBSETS OF A THRESHOLD ARRAY OVER PORTIONS OF AN IMAGE

BACKGROUND OF THE INVENTION

1. Field of the Invention:

The present invention relates generally to the field of image reproduction, and more particularly to digital halftoning. More particularly, the present invention relates to a method and system for halftoning by tiling a threshold array over an image. Still more particularly, the present invention relates to a method and system for halftoning by tiling subsets of a threshold array over portions of an image.

2. Description of the Prior Art:

A printed image is a field of tiny dots of at least one ink color arranged meticulously so as to replicate the multiplicity of colors within the image. Since a limited number of ink colors are available, it is generally not possible to reproduce an image exactly like its original, particularly if that image is a color image. But exact duplication is not necessary. One need only create a believable image, and the human eye and brain will compensate for differences in illumination, color surroundings and tonal range.

Tonal range is important in creating a believable image. Some imaging devices are capable of reproducing acceptable tone directly. Examples of such devices include photography and television. These types of imaging devices can produce a continuous tone, and are typically known as "contone" devices.

Other imaging devices are not able to reproduce acceptable tone directly. These types of devices are typically "binary" or "bi-level" devices and "multi-level" devices. Bi-level devices have only two output values; one value corresponds to "on", the other value to "off." Consequently, bi-level devices produce only one output value (out of the two output values) at any output position. One example of a bi-level device is a dot matrix printer.

Multi-level devices typically have more than two output values but not as many output values as contone devices. In other words, multi-level devices are devices that have M output values for N input values, where N>M. One example of a multi-level device is a color ink jet printer that is capable of marking different densities of color inks on a printing medium.

Bi-level and multi-level devices have limited tonal range. Intermediate tones, such as varying shades of gray, must be represented by halftones. Halftoning, or dithering, is a process by which continuous-tone colors are approximated by a pattern of pixels that can achieve only a limited number of discrete colors. The most familiar case of halftoning is the rendering of gray tones with black and white pixels, as in a newspaper photograph.

A halftone pattern is made up of a region of pixels referred to as the halftone cell. In conventional digital halftoning (halftoning that uses rational tangent angles), a uniformly halftoned area contains specific, repeatable patterns made out of halftone cells. The tonal value of a halftone pattern depends upon the number of pixels in the halftone cell.

A threshold value represents the tone value at which the pixel is turned "on." Each pixel within a halftone cell is assigned a threshold value. Typically a threshold array (or pattern mask) is used to control the individual pixels in a halftone cell. In simple cases, a threshold array covers the area taken up by a halftone cell. In more complex cases, a threshold array can cover multiple (but an integral number) of halftone cells. The threshold array is replicated and "tiled" (i.e., filled in a non-overlapping manner) over the entire device space. Each pixel in the device space is then mapped to a particular element of the threshold array. For more information on digital halftoning, see pages 57–71 of Graphic Gems II (1991), ISBN 0-12-064480-0.

Halftoning can be implemented via hardware or software. When implemented in software, halftoning typically is a preprocessing step. In other words, the image data is halftoned before being sent to an output device, such as a printer. For hardware implementations, halftoning can be performed as a preprocessing step or while the image data is displayed. Performing halftoning while the image data is displayed allows for halftoning to occur in real-time.

Two prior art halftoning systems are illustrated in FIGS. 1a–1b. Only a portion of each halftoning system is shown in FIGS. 1a–1b. In FIG. 1a, prior art halftoning system 100 is preferably formed in an application-specific integrated circuit (ASIC) and is comprised of memory 102, processor 104, and I/O controller 106. An entire threshold array is stored in memory 102. Pixel display values are input into processor 104 via input line 108 for halftoning. Their corresponding threshold array values stored in memory 102 are input into processor 104 and are used to perform halftoning. I/O controller 106 controls the output of the halftoned pixel display values to an output device, such as a printer.

The halftoning system depicted in FIG. 1a can perform very high speed halftoning. This is because the threshold array stored in memory 102 is integrated within the ASIC, which allows for faster accessing of the threshold array values in order to meet the throughput requirements of the output device. A limitation to the system in FIG. 1a, however, is that as the threshold array gets large, the cost of making an ASIC with internal memory for the array becomes prohibitive. In other words, the ASIC becomes too expensive to produce. For example, in U.S. Pat. Nos. 5,111,310 and 5,341,228, a threshold array containing 128×128 8-bit threshold values is given as an exemplary mask to use when halftoning a 256×256 8-bit class of images. Implementing a threshold array of this size in an ASIC would be expensive.

In another example, a threshold array ("blue noise mask") containing 256×256 values was used in a technique for halftoning discussed by Theophano Mitsa and Kevin J. Parker in their article entitled "Digital Halftoning Technique Using a Blue-Noise Mask", Journal of the Optical Society of America, Volume 9, No. 11, pages 1920–1929 (November, 1992). To store a 256×256 threshold array in memory requires 64 kilobytes of memory. Implementing a memory of that size in an ASIC would be very expensive, and significantly increase the cost of the output device.

An alternative implementation for prior art halftoning system 100 is shown in FIG. 1b. In this implementation, memory 102 is located outside of the ASIC. In other words, the entire threshold array is stored in a memory that is separate and distinct from the ASIC. This reduces the cost of the ASIC. But speed can be an issue, in that the transfer of the threshold array values from the memory into the processor must be sufficiently fast in order to maintain real-time halftoning. In other words, the speed of transferring the threshold array values to the processor must be at least as fast as the output of the output device for real-time halftoning. This can be difficult to carry out when the throughput of the output device becomes large, because this requires the threshold array values be accessed more frequently. So as the throughput of the output device increases, it becomes more difficult to transfer the threshold array values fast enough to keep up with the output device.

SUMMARY OF THE INVENTION

The present invention overcomes the limitations of prior art systems by utilizing two separate memory elements for storing a threshold array. This is useful for rational tangent screens and stochastic screens, for example, since these screens have threshold arrays in which subsets of the threshold array repeats spatially. A first memory associated with a system for halftoning stores the threshold array, wherein the threshold array is comprised of threshold array values. When the pixel display values in an image are to be halftoned, a subset of the threshold array values stored in the first memory is transferred to a buffer. In the preferred embodiment, the subset of threshold array values stored in the buffer correspond to a portion of pixel display values in a raster scanline. Furthermore, the portion of pixel display values in the scanline preferably comprise a portion of pixel display values that are associated with one color plane.

The subset of threshold array values stored in the buffer is used repeatedly to halftone portions of pixel display values in a scanline of the image. Specifically, for a raster printer used in the preferred embodiment, a single tall horizontal slice of threshold array values from the threshold array is stored in the buffer in an application specific integrated circuit (ASIC). Since this slice repeats itself along a scanline on the page, the buffer can be accessed repeatedly to provide quick and easy access to the threshold array values stored therein.

When all of pixel display values in the scanline that correspond to the particular color plane have been halftoned, pixel display values from a different scanline (but preferably still the same color plane) are halftoned using a different subset of threshold array values. Once all of the pixel display values for the particular color plane have been halftoned using subsets of threshold array values, pixel display values from a different color plane are halftoned using the same technique. This process continues until the entire image has been halftoned. When the pixel display values are halftoned, they can be output to an output device on the fly, i.e. as they are halftoned, or saved in a buffer and sent to an output device at a later time.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIGS. 1a–1b are block diagrams illustrating prior art halftoning systems;

DESCRIPTION OF THE PREFERRED EMBODIMENT

To facilitate an understanding of the present invention, it is described hereinafter in the context of a specific embodiment. In particular, reference is made to the implementation of the invention in a color printer which employs a CMYK color space to represent colors. It will be appreciated, however, that the practical applications of the invention are not limited to this particular embodiment. Rather, the invention can be employed in any device that performs halftoning, such as monochromatic printers, CRT monitors, LCD display screens, facsimile machines, and copiers.

Figure 2:
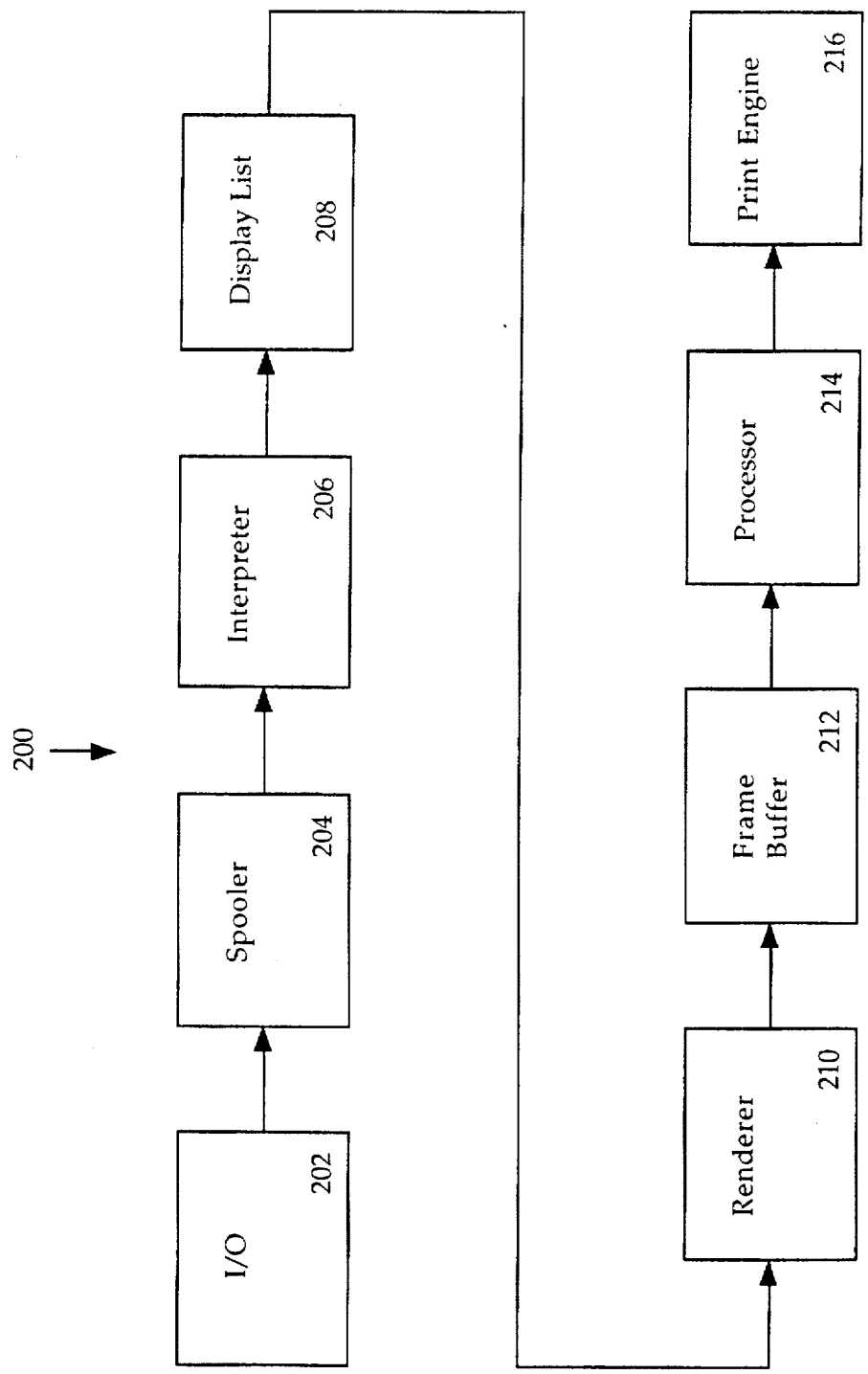
FIG. 2 is a block diagram depicting the components of an exemplary printing system in which the present invention may be implemented.

With reference now to the figures and in particular with reference to FIG. 2, a block diagram illustrates the components of an exemplary printing system in which the present invention may be implemented. Printing system 200 includes an input-output (I/O) controller 202 that is connected to one or more I/O ports (not shown) for communication with computers and other external sources of data to be printed. Spooler 204 accumulates image data received from the external sources, and stores the data until it is ready to be processed for printing. It will be appreciated by those skilled in the art that spooler 204 is optional and can be incorporated in an external device rather than in the printer itself.

Interpreter 206 receives the image data and issues instructions which cause the desired image to be drawn, or printed, on paper. For example, one set of instructions can identify the appearance state of objects to be drawn. This appearance state indicates the color of the object, as well as other appearance-related factors, such as patterns or the like. Another other set of instructions can describe the object to be drawn, such as a rectangle, a particular character of text, or the like.

In the illustrated exemplary printing system, the instructions are stored in an intermediate form, known as a display list 208, or metafile. The information in display list 208 is provided to renderer 210. Renderer 210 converts the object-based information into individual pixel display values. The individual pixel display values are then stored in frame buffer 212. The pixel display values stored in frame buffer 212 can undergo optional processing within one or more processors 214. For example, the display values can be halftoned, compressed and/or decompressed. Ultimately, the display values are supplied to a print engine 216, to control the actual printing of the desired image. The print engine can be, for example, the laser beam type. Alternatively, the print engine can be the ink jet type.

In the preferred embodiment, the method and system for halftoning according to the present invention is implemented in processor 214. The preferred method and system for halftoning will be described in greater detail in conjunction with FIGS. 3–5.

Figure 3:
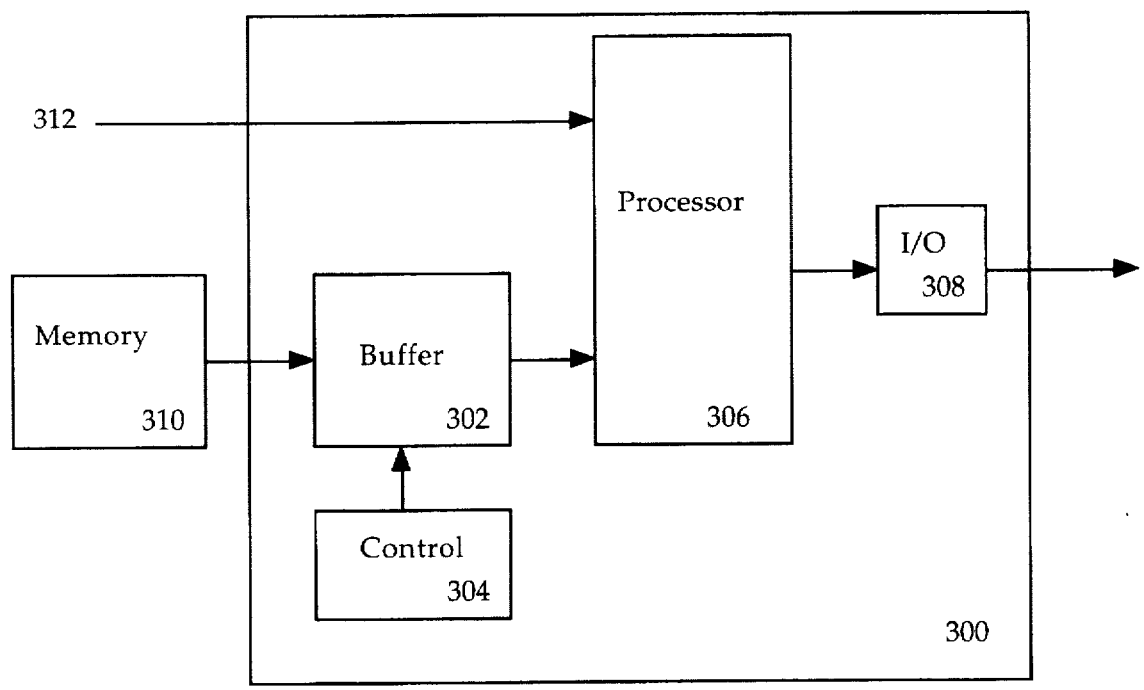
FIG. 3 is a block diagram illustrating a preferred halftoning system according to the present invention.

Referring to FIG. 3, a block diagram illustrates a preferred halftoning system according to the present invention. Only the portions of a halftoning system that are necessary to describe the present invention are shown in FIG. 3. Halftoning system 300 is comprised of buffer 302, controller 304, processor 306, I/O controller 308, and memory 310. Memory 310 preferably stores an entire threshold array. Pixel display values are input into processor 306 via input line 312. In the preferred embodiment, buffer 302 resides in an ASIC and memory 310 resides outside of the ASIC.

When the pixel display values are to be halftoned, a portion of the pixel display values are input into processor 306. A specific subset of the threshold array stored in memory 310 is transferred to buffer 302. The subset of the threshold array values stored in buffer 302 correspond to the portion of the pixel display values input into processor 306. Controller 304 controls the transfer of threshold array values between memory 310 and buffer 302.

The portion of the pixel display values are then halftoned by processor 306 using repeatedly the subset of threshold array values stored in buffer 302. The process of inputting portions of the pixel display values and buffering a subset of the threshold array values for halftoning continue until the entire image is halftoned. I/O controller 308 controls the output of the halftoned pixel display values to an output device, such as a printer. The halftoned pixel display values can be output on the fly, i.e. as they are halftoned, or buffered and sent to the output device at a later time.

In the preferred embodiment, the portion of the pixel display values that are input into processor 306 comprise a portion of a raster scanline of the image, and the subset of threshold array values stored in buffer 302 correspond to the threshold array values associated with the raster scanline of pixel display values. Furthermore, the portion of the pixel display values input into processor 306 are preferably comprised of pixel display values that correspond to one color plane. Once all of the pixel display values in the scanline that correspond to the particular color plane are halftoned, pixel display values from a different scanline (but preferably still the same color plane) are halftoned using a different subset of threshold array values. Once all of the pixel display values for the particular color plane have been halftoned, pixel display values from a different color plane are halftoned using the technique described above. This process continues until the entire image has been halftoned.

For example, if the output device is a CMYK color printer, a portion of pixel display values in the first raster scanline corresponding to the cyan color plane are halftoned using a subset of the threshold array values stored in the buffer. Once all of the pixel display values in the first scanline that correspond to the cyan color plane are halftoned, pixel display values from any additional scanlines (corresponding to the cyan color plane) are halftoned by storing corresponding subsets of the threshold array values in the buffer and using those subsets to halftone the pixel display values. Once all of the pixel display values for the cyan color plane have been halftoned, pixel display values from a different color plane, such as yellow, are halftoned using the technique described above. Finally, when all of the pixel display values corresponding to the yellow color plane have been halftoned, pixel display values from the magenta color plane and black color plane are halftoned using the technique described above.

Although the present invention has been described using a raster scanline of threshold array values, the present invention is not limited to such implementation. Multiple raster scanlines can be combined to form a subset, or a portion of a scanline (or scanlines) can be used. The subset of threshold array values can also be formed in any shape. A rectangle of threshold array values is used as a subset in the preferred embodiment. But the shape of the subset can be anything, such as a diamond, square, hexagon, or trapezoid. Essentially any pattern that tiles a plane can be used to create a subset of threshold array values. The design criterion for creating a subset is that the subset be used repeatedly before buffer 302 has to be reloaded.

Figure 4:
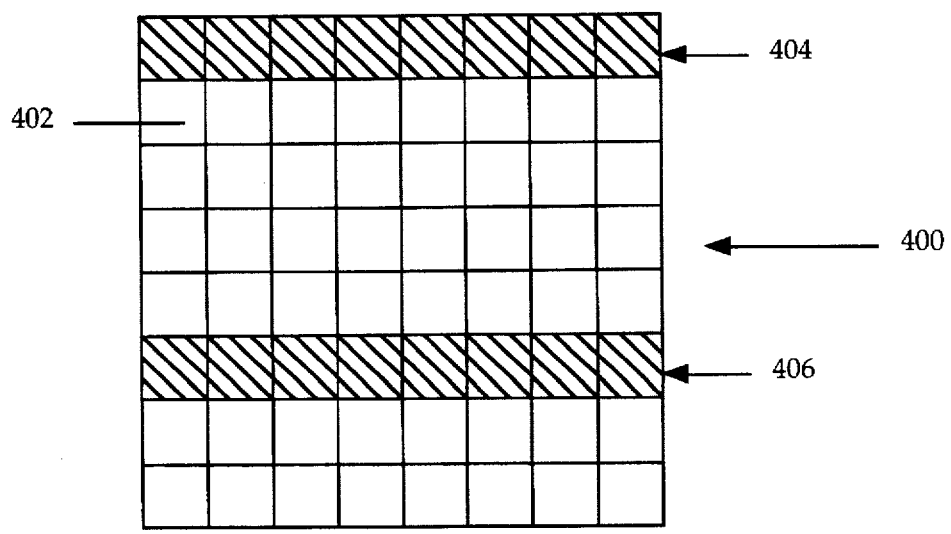
FIG. 4 is a pictorial representation of an exemplary threshold array according to the present invention.

FIG. 4 is a pictorial representation of an exemplary threshold array according to the present invention. Threshold array 400 is an 8×8 array and is preferably stored in a memory. Each element 402 in array 400 corresponds to at least one pixel display value. Row 404 is an example of a subset of threshold array values in threshold array 400 that can be transferred from the memory to a buffer and used to halftone a portion of pixel display values according to the present invention. Row 406 is another example of a subset of threshold array values in threshold array 400 that can be transferred from the memory to a buffer and used to halftone a portion of pixel display values according to the present invention.

Figure 5:
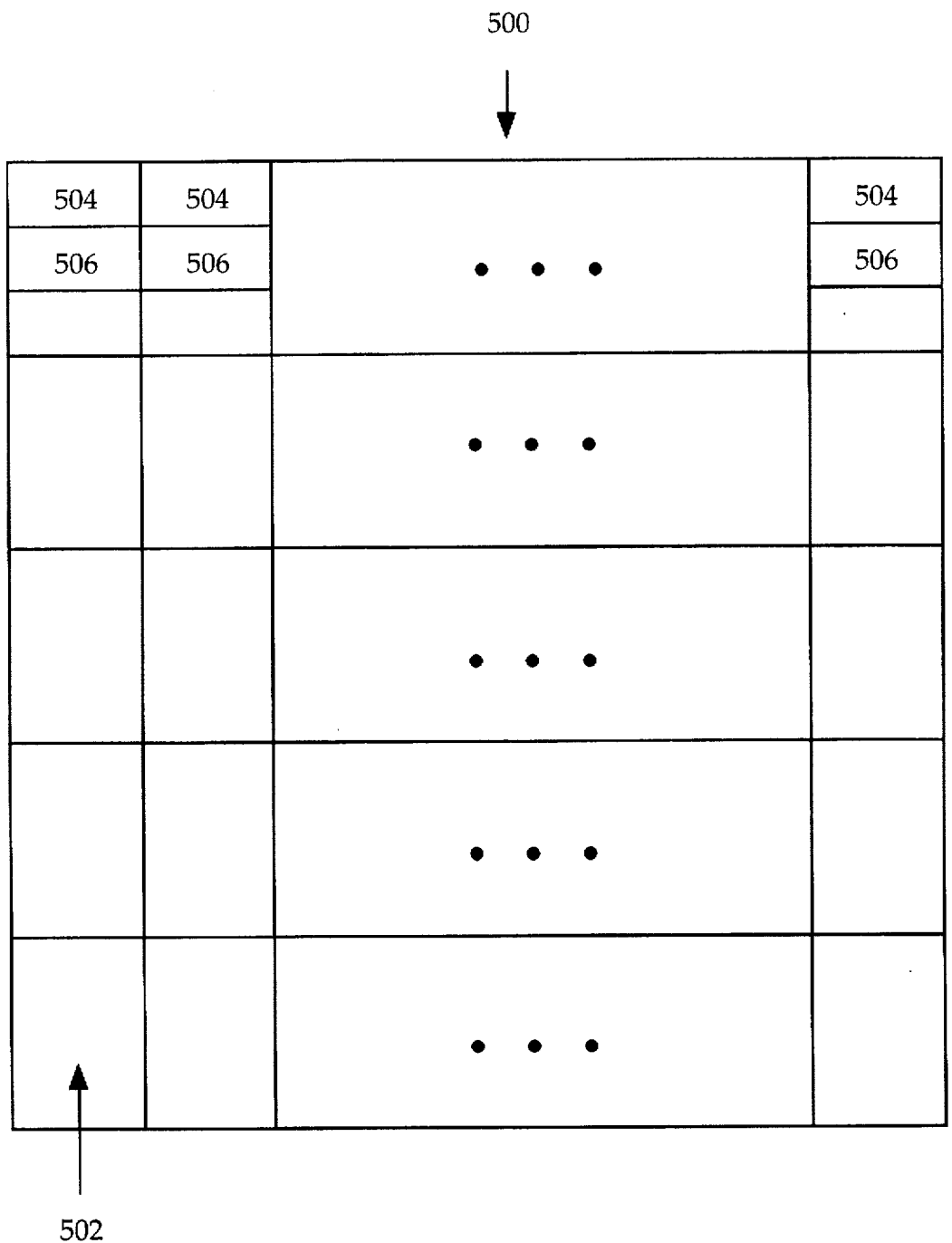
FIG. 5 depicts a preferred method of tiling subsets of threshold array values over an image according to the present invention.

Referring to FIG. 5, a preferred method of tiling subsets of threshold array values over an image according to the present invention is depicted. Image 500 is comprised of a collection of blocks 502 that coincide with a threshold array. In other words, each block 502 contains pixel display values that correspond to a threshold array. A first subset of the threshold array values 504 is used repeatedly to halftone a scanline of the image. As discussed earlier, in the preferred embodiment, the first subset of the threshold array values 504 corresponds to a portion of pixel display values for a particular color plane. When all of pixel display values in the particular color plane in the scanline have been halftoned, pixel display values from a different scanline (but still the same color plane) are halftoned using a different subset of threshold array values 506. Once all of the pixel display values for the particular color plane have been halftoned using subsets of threshold array values, pixel display values from a different color plane are halftoned using the same technique. This process continues until the entire image has been halftoned.

Figure 6:
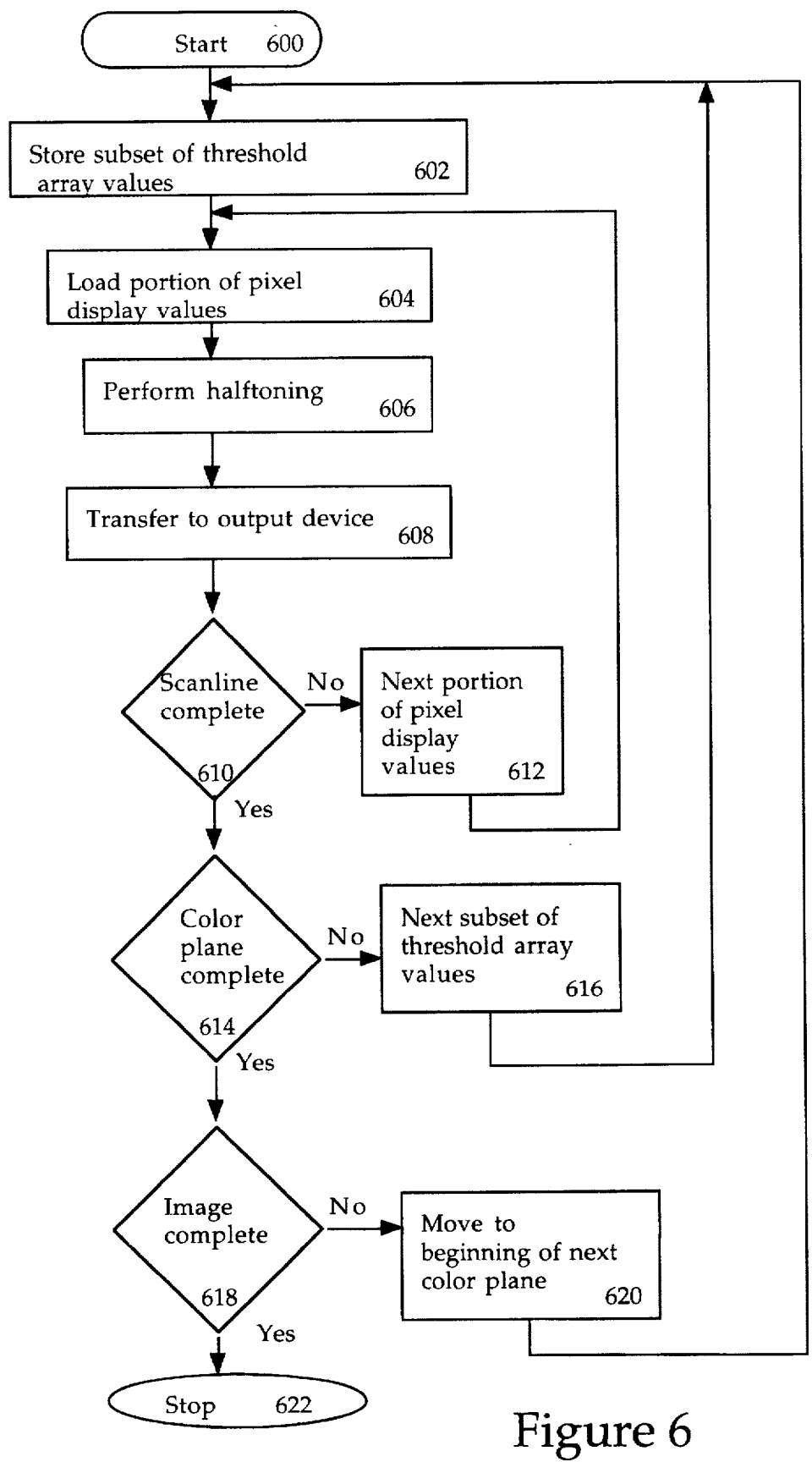
FIG. 6 is a flowchart illustrating a method for halftoning according to the present invention.

FIG. 6 is a flowchart illustrating a method for halftoning according to the present invention. The method begins at block 600, and thereafter passes to block 602. Block 602 illustrates the step of storing a subset of a threshold array values in a buffer. A portion of the pixel display values corresponding to the subset of the threshold array values are then input into a processor and are halftoned, as shown in blocks 604 and 606. In the preferred embodiment, the portion of the pixel display values that are halftoned using the subset of threshold array values stored in the buffer correspond to a particular color plane.

After the portion of pixel display values are halftoned, the halftoned pixel display values are transferred to an output device. Block 608 depicts this step. In the preferred embodiment, the output device is a printer, so the halftoned pixel display values are transferred to the print engine.

A determination is then made in block 610 as to whether or not the pixel display values corresponding to a particular color plane from a scanline have been halftoned. If the pixel display values for a particular color plane in the scanline have not been halftoned, a new portion of pixel display values are obtained (block 612) and the process returns to block 604. Alternatively, if the pixel display values corresponding to a particular color plane in the scanline have been halftoned, the method continues at block 614 with a determination as to whether or not all of the pixel display values in the particular color plane have been halftoned.

If all of the pixel display values have not been halftoned, a new subset of threshold array values is obtained, as shown in block 616. The method then returns to block 602. Alternatively, if all of the pixel display values in the particular color plane have been halftoned, the method continues at block 618 with a determination as to whether or not all of the pixel display values in the image have been halftoned.

If the entire image has not been halftoned, the process repeats by starting with the pixel display values at the beginning of the next color plane, as shown in block 620. The method then returns to block 602 to repeat. If the entire image has been halftoned, the method ends at block 622.

The present invention overcomes the limitations of prior art systems by utilizing two separate memory elements for storing a threshold array. This is useful for rational tangent screens and stochastic screens, for example, since these screens have threshold arrays in which subsets of the threshold array repeats spatially. Although the method and system of the present invention are similar to the use of a general cache, they differ from a general cache in several ways. The first difference is that a general cache is a buffer that stores frequently accessed instructions and data and is used to reduce access time. The data stored in the general cache is data that is likely to be needed next by a processor. If data that is needed by the processor is not in the cache, the cache fails and the processor must obtain the data from main memory. What is required to insure the correct data is stored in the cache (so the cache does not fail) is the ability to accurately predict the particular data that will be needed by the processor. Halftoning with a threshold array provides this predictability because the threshold array is tiled over the image. So which threshold array values will be needed by the processor is determinable and predictable.

Furthermore, a general cache requires a large and complex cache control system. The method and system of the present invention does not require a complex control system because, as stated above, the particular threshold array values that will be needed by the processor are determinable and predictable. So controlling the buffer that stores subsets of threshold array values is not complex. Thus, the present invention provides several advantages over a general cache, in that it is simpler to implement and is faster than a general cache.

Other advantages to the present invention are that it allows halftoning to be performed in real-time no matter how large a threshold array grows. The delicate balance between performance speed and threshold array size is eliminated. In addition, the present invention achieves improved performance by allowing fast accessing of the threshold array values in the buffer. Furthermore, because the number of accesses of the first memory are reduced, bus traffic is reduced and overall system performance is improved.

While the invention has been particularly shown and described with reference to a preferred embodiment, it will be understood by those skilled in the art that various changes in form and detail may be made therein without departing from the spirit and scope of the invention. For example, the present invention has been described with reference to a hardware system. Those skilled in the art will recognize that it can also be implemented using computer software.

What is claimed is:

1. A method for halftoning a portion of pixel display values from an image in an image processing system, wherein a threshold array corresponding to the image is stored in a memory associated with the image processing system, said method comprising the steps of:

storing a subset of threshold array values from the threshold array in a buffer, wherein the subset of threshold array values stored in the buffer are arranged in a pattern that can be tiled over the portion of pixel display values to be halftoned; and halftoning portions of the portion of pixel display values by repeatedly using the subset of threshold array values stored in the buffer until the entire portion of pixel display values has been halftoned.

2. The method of claim 1, further comprising the step of transferring the halftoned pixel display values to an output device.

3. The method of claim 2, wherein the output device is a printer.

4. The method of claim 1, wherein the subset of threshold array values stored in the buffer is arranged in a pattern that corresponds to a portion of pixel display values in a raster scanline.

5. A method for halftoning an image comprised of a plurality of pixels having pixel display values associated therewith, wherein a threshold array having threshold array values corresponding to the image is stored in a memory, the method comprising the steps of:

storing a subset of threshold array values from the threshold array in a buffer, wherein the subset of threshold array values stored in the buffer is arranged in a pattern that can be tiled over a portion of pixel display values to be halftoned;

halftoning the portion of pixel display values by repeatedly using the subset of threshold array values stored in the buffer until the entire portion of pixel display values has been halftoned; and repeating the steps of storing and halftoning until all of the pixel display values in the image have been halftoned.

6. The method of claim 5, further comprising the step of transferring the halftoned pixel display values to an output device.

7. The method of claim 6, wherein the output device is a printer.

8. The method of claim 5, wherein the subset of threshold array values stored in the buffer are arranged in a pattern that corresponds to a portion of pixel display values in a raster scanline.

9. The method of claim 8, wherein the subset of threshold array values stored in the buffer correspond to a portion of pixel display values in a raster scanline for a particular color plane.

10. The method of claim 9, wherein the step of repeating the steps of storing and halftoning until all of the pixel display values in the image have been halftoned comprises repeating the steps of storing and halftoning until all of the pixel display values for a particular color plane have been halftoned.

11. The method of claim 10, further comprising the steps of:

making a determination as to whether all of the pixel display values in the image have been halftoned; and if all of the pixel display values in the image have not been halftoned, advancing to the next color plane and repeating the steps of storing, halftoning, determining and advancing until all of the pixel display values in the image have been halftoned.

12. A method for halftoning an image comprised of pixels having pixel display values associated therewith, and wherein a threshold array having threshold array values that correspond to the image is stored in a memory, the method comprising the steps of:

(a) storing a subset of the threshold array in a buffer, wherein the subset of threshold array values stored in the buffer are arranged in a pattern that can be tiled over a portion of pixel display values to be halftoned;

(b) halftoning the portion of pixel display values by repeatedly using the subset of threshold array values stored in the buffer until the entire portion of pixel display values has been halftoned;

(c) determining whether all of the pixel display values that correspond to a particular color plane have been halftoned;

(d) if all of the pixel display values that correspond to a particular color plane have not been halftoned, storing a new subset of threshold array values in the buffer and repeating steps (b)-(c) until all of the pixel display values for the particular color plane have been halftoned;

(e) when all of the pixel display values that correspond to a particular color plane have been halftoned, making a determination as to whether all of the pixel display values in the image have been halftoned; and (f) if all of the pixel display values in the image have not been halftoned, advancing to the next color plane and repeating steps (a)-(f) until all of the pixel display values in the image have been halftoned.

13. The method of claim 12, further comprising the step of transferring the halftoned pixel display values to an output device.

14. The method of claim 1, wherein the output device is a printer.

15. The method of claim 12, wherein the subset of threshold array values are arranged in a pattern that corresponds to a portion of pixel display values in a raster scanline.

16. A system for halftoning an image, wherein the image is comprised of a plurality of pixels having pixel display values associated therewith, the system comprising:

a memory having a threshold array comprised of threshold array values stored therein, wherein the threshold array stored in the memory corresponds to the image to be halftoned;

a buffer connected to an output of the memory, wherein a subset of threshold array values is stored in the buffer, and wherein the subset of threshold array values is arranged in a pattern that can be tiled over a portion of pixel display values to be halftoned;

a processor connected to an output of the buffer, wherein the processor halftones the portion of the pixel display values by repeatedly using the subset of threshold array values stored in the buffer until the entire portion of pixel display values has been halftoned; and means for repeatedly storing a subset of threshold array values in the buffer and halftoning a portion of the pixel display values by repeatedly using the subset of threshold array values until all of the pixel display values in the image have been halftoned.

17. The system of claim 16, wherein the buffer and the processor reside in an application specific integrated circuit (ASIC), and wherein the memory resides outside of the ASIC.

18. The system of claim 16, wherein a subset of the threshold array values is arranged in a pattern that corresponds to a portion of pixel display values in a raster scanline.

* * * * *